(12) United States Patent
Liu et al.

(10) Patent No.: US 11,749,020 B2
(45) Date of Patent: Sep. 5, 2023

(54) METHOD AND APPARATUS FOR MULTI-FACE TRACKING OF A FACE EFFECT, AND ELECTRONIC DEVICE

(71) Applicant: BEIJING MICROLIVE VISION TECHNOLOGY CO., LTD, Beijing (CN)

(72) Inventors: Gao Liu, Beijing (CN); Xin Lin, Beijing (CN)

(73) Assignee: BEIJING MICROLIVE VISION TECHNOLOGY CO., LTD, Beijing (CN)

(*) Notice: Subject to any disclaimer, the term of this patent is extended or adjusted under 35 U.S.C. 154(b) by 0 days.

(21) Appl. No.: 16/968,209

(22) PCT Filed: Dec. 25, 2018

(86) PCT No.: PCT/CN2018/123642
§ 371 (c)(1),
(2) Date: Aug. 7, 2020

(87) PCT Pub. No.: WO2020/019666
PCT Pub. Date: Jan. 30, 2020

(65) Prior Publication Data
US 2021/0027046 A1 Jan. 28, 2021

(30) Foreign Application Priority Data
Jul. 27, 2018 (CN) .......................... 201810838375.3

(51) Int. Cl.
G06V 40/16 (2022.01)
G06T 7/62 (2017.01)
G06V 40/18 (2022.01)

(52) U.S. Cl.
CPC .............. *G06V 40/171* (2022.01); *G06T 7/62* (2017.01); *G06V 40/193* (2022.01)

(58) Field of Classification Search
CPC .............. G06K 9/00281; G06K 9/0061; G06K 9/00261; G06K 9/00221; G06T 7/62; G06T 2207/30201; G06T 7/246; G06T 3/0012
See application file for complete search history.

(56) References Cited

U.S. PATENT DOCUMENTS

| 8,988,436 B2 * | 3/2015 | Becker ..................... G06T 13/40 |
| | | 345/473 |
| 9,082,001 B2 * | 7/2015 | Muninder ............ G06V 10/811 |

(Continued)

FOREIGN PATENT DOCUMENTS

| CN | 107369141 A | 11/2017 |
| CN | 107666567 A | 2/2018 |

(Continued)

OTHER PUBLICATIONS

International Patent Application No. PCT/CN2018/123642; Int'l Search Report; dated Apr. 30, 2019; 2 pages.

*Primary Examiner* — Wesley J Tucker
(74) *Attorney, Agent, or Firm* — BakerHostetler

(57) ABSTRACT

Disclosed is a method and apparatus for multi-face tracking of a face effect, and a computer readable storage medium. The method for multi-face tracking of a face effect comprises steps of: selecting a face effect in response to an effect selection command; selecting a face tracking type of the face effect in response to a face tracking type selection command; generating a face tracking sequence based on the face tracking type; recognizing a face image captured by an image sensor; superimposing the face effect on at least one of the face images according to the face tracking sequence. In the embodiment of the invention, for the face that needs to be tracked as specified by the effect, the number of faces of superimposed faces for the face effect, the superimposition order, and the display duration of the face effect can be (Continued)

arbitrarily set, and different effects can be superimposed on multiple faces, so as to improve the user experience.

17 Claims, 3 Drawing Sheets

(56) References Cited

U.S. PATENT DOCUMENTS

| | | | |
|---|---|---|---|
| 10,166,477 B2* | 1/2019 | Miyamae | G06F 3/012 |
| 10,810,779 B2* | 10/2020 | Zatepyakin | G06T 13/40 |
| 2002/0018070 A1* | 2/2002 | Lanier | G06T 7/70 |
| | | | 345/629 |
| 2011/0304644 A1* | 12/2011 | Wada | G09G 5/377 |
| | | | 345/619 |
| 2012/0051658 A1* | 3/2012 | Tong | G11B 27/034 |
| | | | 382/224 |
| 2014/0016823 A1* | 1/2014 | Ye | G06T 19/20 |
| | | | 382/103 |
| 2016/0330369 A1 | 11/2016 | Corcoran et al. | |
| 2019/0130652 A1* | 5/2019 | Yu | G06T 13/40 |
| 2019/0311540 A1* | 10/2019 | Kovacevitch | G06T 19/006 |
| 2019/0325631 A1* | 10/2019 | Cao | G06T 13/40 |
| 2021/0133430 A1* | 5/2021 | Yang Mao | G06V 40/166 |
| 2021/0165998 A1* | 6/2021 | Cao | G06K 9/00315 |
| 2021/0311618 A1* | 10/2021 | Barton | G06F 3/0482 |
| 2023/0020218 A1* | 1/2023 | Berger | G06V 40/161 |

FOREIGN PATENT DOCUMENTS

| | | |
|---|---|---|
| CN | 107948506 A | 4/2018 |
| CN | 108012081 A | 5/2018 |
| CN | 108289185 A | 7/2018 |
| CN | 108322802 A | 7/2018 |
| CN | 109034063 A | 12/2018 |
| EP | 3154029 A1 | 4/2017 |
| JP | 2008-131559 A | 6/2008 |
| JP | 2009-124231 A | 6/2009 |
| JP | 2011-055066 A | 3/2011 |
| JP | 2011-138240 A | 7/2011 |
| JP | 2012-182820 A | 9/2012 |
| JP | 2015-111836 A | 6/2015 |
| WO | WO 2007/119355 A1 | 10/2007 |

* cited by examiner

METHOD AND APPARATUS FOR MULTI-FACE TRACKING OF A FACE EFFECT, AND ELECTRONIC DEVICE

CROSS REFERENCE

The disclosure is the national phase application of International Patent Application No. PCT/CN2018/123642, titled "METHOD AND APPARATUS FOR MULTI-FACE TRACKING OF A FACE EFFECT AND ELECTRONIC DEVICE", filed on Dec. 25, 2018, which refers to a Chinese patent application No. 201810838375.3, filed on Jul. 27, 2018, entitled "Method and apparatus for multi-face tracking of a face effect, and an electronic device", both of which are hereby incorporated by reference in their entireties.

FIELD

The disclosure relates to the technical field of image, and more particularly, to a method for multi-face tracking of a face effect, an apparatus thereof, a hardware apparatus thereof and a computer readable storage medium.

BACKGROUND

With the development of computer technology, the application range of smart terminals has been widely expanded, for example, listening to music, playing games, chatting on the Internet, and taking pictures through smart terminals. For the photographing technology of the smart terminal, the pixel has reached more than 10 million, and has high definition with the effects comparable to the professional camera.

At present, when using a smart terminal to take a picture or take a video, not only can the built-in photographing software at the factory be used to realize the photographing and video effects of traditional functions, but also can the application (referred to as: APP) be downloaded from the network to realize the photographing effect or video effect with additional functions.

However, the current effects production APP can only set effects on one face, and cannot set effects on multiple faces at the same time and track faces.

SUMMARY

According to an aspect of the disclosure, the disclosure provides a method for multi-face tracking of a face effect comprising steps of: selecting a face effect in response to an effect selection command; selecting a face tracking type of the face effect in response to a face tracking type selection command; generating a face tracking sequence based on the face tracking type; recognizing a face image captured by an image sensor; superimposing the face effect on at least one of the face images according to the face tracking sequence.

Further, the face tracking type is all faces, and the generating a face tracking sequence based on the face tracking type comprises: generating a face tracking sequence comprising all recognized faces based on the face tracking type being all faces.

Further, the superimposing the face effect on at least one of the face images according to the face tracking sequence comprises: superimposing the face effect on all recognized face images according to the face tracking sequence.

Further, the generating a face tracking sequence based on the face tracking type comprises: the face tracking type being a custom type, generating a face tracking sequence according to a custom tracking order based on the face tracking type being a custom type.

Further, the generating a face tracking sequence according to a custom tracking order further comprises: setting the number of faces that need to be tracked; setting an identification of faces that need to be tracked; generating the face tracking sequence according to the number of face and the identification of faces, the face tracking sequence comprising face identifications of the number of faces.

Further, the generating a face tracking sequence according to a custom tracking order further comprises: setting a start time and an end time of the tracking of the face according to the face identification, the face tracking sequence comprising the start time and the end time.

Further, the recognizing a face image captured by an image sensor comprises: recognizing a face image captured by an image sensor by using face recognition algorithm; setting a face identification for the face image according to the recognition order.

Further, the superimposing the face effect on at least one of the face images according to the face tracking sequence comprises: reading the face identification from the face tracking sequence, superimposing the face effect on the face image corresponding to the face identification.

Further, the face effect comprises one or more of a two-dimensional sticker, a three-dimensional sticker, a beauty effect, and a deformation effect.

Further, the effect comprises more effects, and a face tracking sequence is generated for each effect.

According to another aspect of the disclosure, the disclosure provides an apparatus for multi-face tracking of a face effect, characterized by comprising: a face effect selection module for selecting a face effect in response to an effect selection command; a face tracking type selection module for selecting a face tracking type of the face effect in response to a face tracking type selection command; a face tracking sequence generation module for generating a face tracking sequence based on the face tracking type; a face recognition module for recognizing a face image captured by an image sensor; an effect superimposition module for superimposing the face effect on at least one of the face images according to the face tracking sequence.

Further, the face tracking type is all faces, and the face tracking sequence generation module is used for generating a face tracking sequence comprising all recognized faces based on the face tracking type being all faces.

Further, the effect superimposition module is used for superimposing the face effect on all recognized face images according to the face tracking sequence.

Further, the face tracking sequence generation module is used for: the face tracking type being a custom type, generating a face tracking sequence according to a custom tracking order based on the face tracking type being a custom type.

Further, the face tracking sequence generation module further comprises a face number setting module 231, a first face identification setting module and a face tracking sequence generation sub-module. Among which, the face number setting module is used for setting the number of faces that need to be tracked; the first face identification setting module is used for setting identifications of faces that need to be tracked; the face tracking sequence generation sub-module is used for generating the face tracking sequence according to the number of face and the face identification, the face tracking sequence comprising face identifications of the number of faces.

Further, the face tracking sequence generation module further comprises a tracking time setting module for setting a start time and an end time of the tracking of the face according to the face identification, the face tracking sequence comprising the start time and the end time.

Further, the face recognition module comprises a face recognition sub-module for recognizing a face image captured by an image sensor by using face recognition algorithm, and a second face identification setting module for setting a face identification for the face image according to the recognition order.

Further, the effect superimposition module is used for reading the face identification from the face tracking sequence, superimposing the face effect on the face image corresponding to the face identification.

Further, the face effect comprises one or more of a two-dimensional sticker, a three-dimensional sticker, a beauty effect, and a deformation effect.

Further, the effect comprises more effects, and a face tracking sequence is generated for each effect.

According to still another aspect of the disclosure, the disclosure provides an electronic device comprising: a memory for storing a non-transitory computer readable instruction; and a processor for executing the computer readable instruction such that the processor, when executed, implements the steps of any one of the methods described above.

According to still another aspect of the disclosure, the disclosure provides a computer readable storage medium for storing a non-transitory computer readable instruction; when the non-transitory computer readable instruction is executed by a computer, the computer is caused to execute the steps of any one of the methods described above.

Disclosed is a method for multi-face tracking of a face effect, an apparatus thereof, and a computer readable storage medium in the embodiments. The method for multi-face tracking of a face effect comprises steps of: selecting a face effect in response to an effect selection command; selecting a face tracking type of the face effect in response to a face tracking type selection command; generating a face tracking sequence based on the face tracking type; recognizing a face image captured by an image sensor; superimposing the face effect on at least one of the face images according to the face tracking sequence. In the embodiment of the disclosure, for the face that needs to be tracked as specified by the effect, the number of faces of superimposed faces for the face effect, the superimposition order, and the display duration of the face effect can be arbitrarily set, and different effects can be superimposed on multiple faces, so as to improve the user experience.

The above description is only an overview of the technical solutions of the disclosure. In order to more clearly understand the technical means of the disclosure, which can be implemented in accordance with the contents of the specification, and to make the above and other objects, features and advantages of the disclosure become more apparent and obvious, hereinafter, preferred embodiments will be described in detail with reference to the accompanying drawings.

DETAILED DESCRIPTION OF EMBODIMENTS

Through specific examples of the disclosure below, technicians of the field can easily understand other advantages and efficacies of the disclosure revealed by the specification obviously, the described embodiments are only a part of the embodiments of the disclosure, but not the whole. The disclosure can also be implemented or applied through other different ways, and the details of the specification can also be modified or changed based on different views and applications without deviating from the spirit of the disclosure. It should be noted that, in the case of no conflicts, the following embodiments and features in the embodiments can be combined mutually. Based on the embodiments of the present disclosure, all the other embodiments obtained by those of ordinary skill in the art without inventive effort are within the scope of the present disclosure.

It is to be noted that various aspects of the embodiments within the scope of the appended claims are described below. It should be apparent that the aspects described herein may be embodied in a wide variety of forms, and any specific structure and/or function described herein is merely illustrative. Based on the disclosure, those skilled in the art will appreciate that one aspect described herein can be implemented independently of any other aspects and that two or more of these aspects can be combined in various ways. For example, the device and/or method can be implemented and/or practiced using any number of the aspects set forth herein. In addition, the device and/or the method may be implemented and/or practiced using other structures and/or functionalities than one or more of the aspects set forth herein.

It should be noted that, the diagrams provided in the following embodiments only illustrate the basic conceptions of the disclosure in a schematic way, thus only components relative to the disclosure are shown instead of drawing the number of components, shape and size in actual implementation, in which the type, the number and proportion of each group can be a kind of random change, and its component, layout type may also be more complex.

In addition, in the following description, specific details are provided to facilitate a thorough understanding of the examples. However, those skilled in the art will appreciate that the aspects can be practiced without these specific details.

Figure 1:
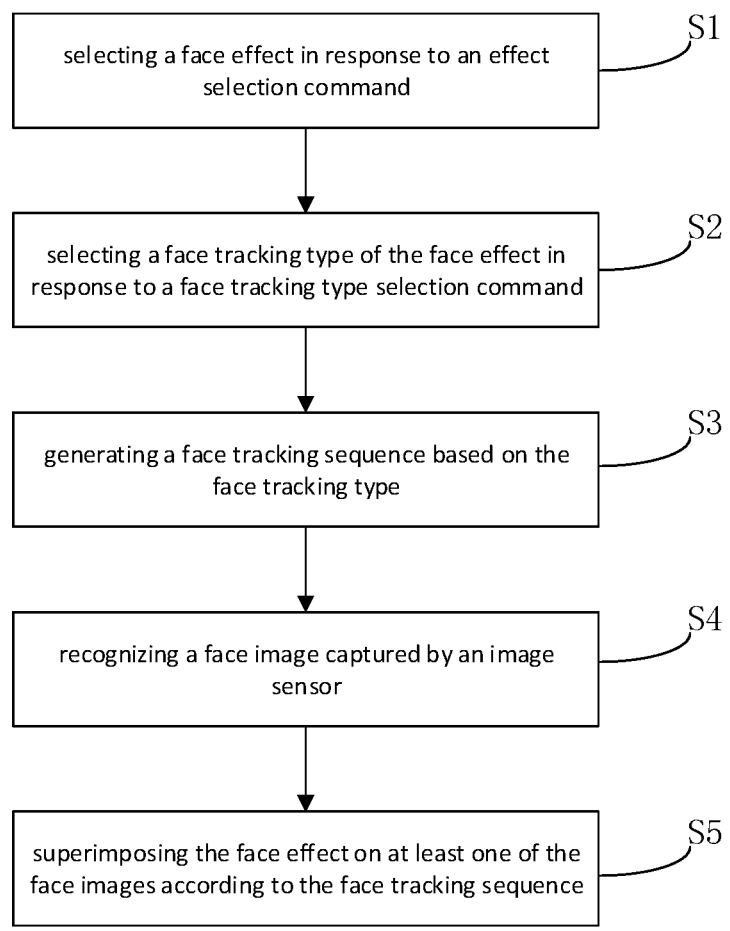
FIG. 1 is a flow chart of a method for multi-face tracking of a face effect according to an embodiment of the disclosure.

In order to solve the technical problem of multi-face tracking of a face effect, disclosed is a method for multi-face tracking of a face effect in the embodiment. As shown in FIG. 1, the method for multi-face tracking of a face effect mainly comprises the following steps S1 to S5. Among which:

Step S1: Selecting a Face Effect in Response to an Effect Selection Command.

Since the face effect has to be corresponded to the face, the face effect is required to be selected and set for multi-face tracking. In the embodiment, selecting the face effect may be selecting an existed face effect, or may be selecting a certain type of face effect for production. That is, the method may be performed separately or may be performed in the process of making a face effect. Among them, the face effect may be a two-dimensional sticker, a three-dimensional sticker, a beauty effect, and a deformation effect, which is not limited herein, and any effects may be used in the disclosure. The effect selection command in the embodiment may be received through human-computer interaction, such as mouse clicks, or keyboard input.

Step S2: Selecting a Face Tracking Type of the Face Effect in Response to a Face Tracking Type Selection Command.

In the embodiment, a face tracking type has to be selected. In a typical application, a drop-down menu or select button is used to select the type of face tracking, which may comprise a method of tracking all faces and custom tracking methods; when the method of tracking all faces is selected, the effect will be superimposed on all faces, and when the custom tracking methods are selected, the user may customize the face to be tracked and the method to track.

Step S3: Generating a Face Tracking Sequence Based on the Face Tracking Type.

In an embodiment, the face tracking type is selected as tracking all faces, and a face tracking sequence may be generated according the type; since the number of faces included in all faces in advance is unknown, the face tracking sequence may be a flag indicating that the face tracking sequence comprises all faces recognized in the future.

In another embodiment, the face tracking type is selected as a custom tracking method, and a face tracking sequence may be generated according the type; the face tracking sequence is customized by the user. In a typical application, the face tracking sequence may be set by setting the number of faces that has to be tracked as n and an identification of the face that has to be tracked, wherein the sequence comprises n face identifications, which may or may not have an order in the face tracking sequence; when the face identification may have an order in the face tracking sequence, the face tracking sequence is a queue of the face identification, and when the face identification may not have an order in the face tracking sequence, the face tracking sequence is a set of the face identifications. The setting the number of the face that has to be tracked as n may comprise directly setting a value of n, or may indirectly setting the value; the indirectly setting comprises adding a face identification, such as setting one more identification for each face identification required, so that a total of n face identifications are set, and the number of faces that have to be tracked is n.

In another embodiment, only the number of the faces that have to be tracked may be set as n.

Among them, n>0, and n is a natural number.

In another embodiment, a display duration of the face effect for each face identification may be set, which is displayed all the time by default. That is to say, as long as the face always exists, the face effect is always superimposed on the face. When the display duration is set, the face effect may be displayed according to the set duration and then disappears.

In another embodiment, a start time and an end time of the tracking of the face may be set for each face identification. In a typical application, the start time and the end time refer to a time delay after the face corresponding to the face identification is recognized. For example, for the face 1, the start time may be set as 5 seconds and the end time as 120 seconds.

In another embodiment, a trigger condition of the face effect may be set for each face identification, and the trigger condition of the effect may be set as appearing some kind of expression, action, gesture, sound, etc., such as setting the trigger condition as nodding.

The settings in the above various embodiments in this step may be combined, and the disclosure is not limited thereto.

Step S4: Recognizing a Face Image Captured by an Image Sensor.

In the embodiment, the face image is captured by using an image sensor, wherein the image sensor may be typically a camera, and the face image captured by the camera is recognized, wherein the face image may be a face recognized from a real person, or may be a picture captured by a camera including a face taken by a camera or a face recognized from a video, which is not limited by the disclosure. Recognizing the face image is mainly to detect a face in the image. The face detection is a process of arbitrarily giving an image or a sequence of images for searching with certain strategies to determine the location and area of all faces, and a process of determining the presence of a face from a variety of different images or sequences of images and determining the number and spatial distribution of the faces. Usually the method for face detection may be divided into 4 categories: (1) a method based on prior knowledge, which uses a typical face formation rule library to encode faces, and preforms a face orientation through the relationship between facial features; (2) a method with unchanged features, which is to find stable features in the case of changes in attitude, view angle or lighting conditions, and then use these features to determine the face; (3) a template matching method, which stores several standard face patterns to describe the entire face and face features, and then calculates the correlation between the input image and the stored mode for detection; (4) a method based on appearance, opposite to the template matching method, learning from a training image set to obtain models and using these models for detection. Here, an implementation of the method (4) is used to illustrate the process of face detection: first, features are required to be extracted for completing modeling, and in the embodiment, Haar feature, a simple rectangle feature, is used as a key feature to determine the face with fast extraction speed, a feature template for the calculation of the Haar feature in general employing a simple combination of rectangles that is composed of two or more congruent rectangles, wherein there are two rectangles in black and white in the feature template; then, AdaBoost algorithm is used to find some of the key features of a large number of Haar features, and these features are used to generate an effective classifier for detection of the face in the image. In the embodiment, the face image in the image may be one or more.

It is to be understood that since each face detection algorithm has its own advantages, and has a different range of adaptation, a plurality of detection algorithms may be set for automatically switching into different algorithms according to different environments, for example, an algorithm with a poor detection rate but a faster speed may be used in an image with a simple background; an algorithm with a higher detection rate but a slower speed may be used in an image with a complicated background environment; for the same image, a plurality of algorithms may be used to improve the detection rate.

In the embodiment, for the recognized face image, the face identification may be set for the recognized face image in order according to the recognition order, or the face identification of the recognized face may be customized as needed.

In an embodiment, the face image recognized from the image sensor is changed. For example, if the face appears one by one in front of the camera, the face may be numbered in turn. However, the face may disappear from the camera, such as the user doing a face-lifting action or walking away from the camera; then, if the number of the face identification of the exiting face is n, the face identification is decremented by 1 from the face number of n+1 until the last face, that is, the face identification after n is advanced one by one, and the face identification is renumbered.

Step S5: Superimposing the Face Effect on at Least One of the Face Images According to the Face Tracking Sequence.

The effect selected in step S1 is superimposed on the face image recognized in step S4 according to the face tracking sequence generated in step S3.

When the face tracking sequence generated in step S3 is a sequence comprising all faces, the face effect is superimposed on all recognized face images. In this case, there may be face images that are recognized one after another, and whenever the face image is recognized, the face effect is superimposed on the face image. For example, at the beginning, there is only one face is in front of the camera, and when the face is recognized, the effect is superimposed on the face; then two more faces appear in front of the camera, and when the faces of these two people are recognized, the effect is continued to be superimposed on the faces of the two people, and so on, with no limit.

When the face tracking sequence generated by the step S3 is a customized sequence, there are two cases according to the description of the step S3: when the customized sequence is a sequence without order, in fact which face being superimposed by the face effect is defined, but no requirement is posed on the superimposed order, for example, when the face tracking sequence may have a sequence of face 1, face 4, face 3, face 5, then the face effect may be superimposed on the faces 1, 3, 4, 5 without superimposing the face effect on the face 3 after superimposing on the face 4; when the customized sequence is a sequence with order, in addition defining which face to be superimposed by the face effect, the superimposing order of the face effect is further defined, for example, when the face tracking sequence may have a sequence of face 1, face 5, face 4, face 3, then the face effect may be superimposed on the face 1 when the face 1 is recognized, following by superimposing the face effect on the face 5 until the face 5 is recognized, and then the face 4 and the face 3 may be superimposed by the face effect. A flag may be used to indicate whether the face tracking sequence has an order or has not an order, for example, 1 for the sequence with order, and 0 for the sequence without order; or another sets of numbers may be used to define whether the face tracking sequence has an order or has not an order, so that when the face tracking sequence has not an order, the numbers of all face identifications may be set the same, for example, 1 for face 1, 1 for face 4, 1 for face 3, and 1 for face 5; when the face tracking sequence has an order, the face identification may be numbered in order, for example, 1 for face 1, 2 for face 5, 3 for face 4 and 4 for face 3. In the embodiment, when an face image is recognized in the step S4, the face image is numbered in order, for example, the first recognized face image is numbered as face 1, and if the face tracking sequence is a sequence without order, the presence of face 1 is determined by searching in the face tracking sequence, and if so, the face effect is superimposed on the face image corresponding to the face 1; if the face tracking sequence is a sequence with order, whether the queue head of the current face tracking sequence is a face 1 is queried, and if so, the face effect is superimposed on the face image corresponding to the face 1, and if no, then waiting, each time the current face identification is located at the head of the queue, the head is moved to the next face identification, so that the loop is repeated until all the face identifications are superimposed by the face effect. When a face effect display duration of the face identification is set in the step S3, beginning with recognizing the face image of the face identification, the face effect disappears after being displayed for the duration. Further, a trigger action for the face effect may be set for the face identification, such as a two-dimensional sticker effect, and if the trigger action of face 1 is nodding, the two-dimensional sticker effect may not be displayed on the face image corresponding to face 1 when face 1 is recognized, and only when the face image performs an action of nodding may the two-dimensional sticker effect be superimposed on the face image corresponding to face 1. Further, when a start time and an end time of the tracking of the face are set, for example, the start time may be set as 5 seconds and the end time as 120 seconds for face 1. Then, after the face image corresponding to face 1 is recognized in the step S4, the face effect is superimposed on the face image corresponding to face 1 by a delay of 5 seconds, and the display of the face effect is ended after a delay of 120 seconds.

In the embodiment, when only the number of faces to be tracked is set to n, it is equivalent to setting the upper limit of the number of faces to be tracked. If the number of recognized faces does not exceed n, it is equivalent to superimposing the face effect on all recognized face images. If the number of recognized faces exceeds n, the face effect is no longer superimposed from the n+1th recognized face image.

In an embodiment, there are many kinds of face effects mentioned above, and after a variety of face effects are selected, a face tracking sequence is generated for each effect, so that different face effects may be displayed on multiple face images recognized from the same image sensor.

In an embodiment of the disclosure, after a face effect is selected, a face tracking mode is selected for the face effect to generate a face tracking sequence, and for the face recognized from the image sensor, the selected face effect is superimposed one by one according to the face tracking sequence. In the prior art, the effect may only be added to the first recognized face image, so that it is not possible to specify the face to which the effect needs to be superimposed, and it is not possible to superimpose different effects on multiple faces. In the embodiment of the disclosure, the face that needs to be tracked can be specified for the effect, the number of faces of superimposed faces for the face effect, the superimposition order, and the display duration of the face effect can be arbitrarily set, and different effects can be superimposed on multiple faces, so as to improve the user experience.

In above description, although the steps in the above method embodiments are described in the order described above, those skilled in that art may appreciate that The steps in the embodiments of the steps in the embodiments of the disclosure are not necessarily performed in the above order, and may also be performed in other orders, such as reverse order, parallel, cross, and the like, and on the basis of above steps, those skilled in the art may also add other steps. The manner in which these obvious variations or equivalent substitutions are also included in the scope of the disclosure, which is not described herein.

The followings are embodiments of the device of the disclosure, which may execute the steps implemented by the method embodiments of the disclosure. For ease of explanation, only parts related to the embodiments of the disclosure are shown. For the specific technical details that are not disclosed, please refer to the method embodiments of the disclosure.

Figure 2:
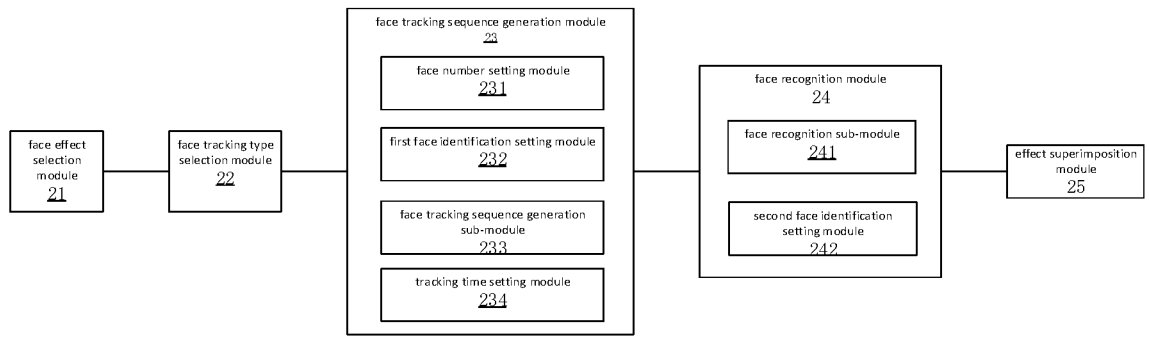
FIG. 2 is a structural diagram of an apparatus for multi-face tracking of a face effect according to an embodiment of the disclosure.

Disclosed is an apparatus for multi-face tracking of a face effect in the embodiments. The apparatus may execute the steps according to the embodiments of above method for multi-face tracking with face effect. As shown in FIG. 2, the apparatus mainly comprises a face effect selection module 21, a face tracking type selection module 22, a face tracking sequence generation module 23, a face recognition module 24, an effect superimposition module 25. Among which: the face effect selection module 21 is used for selecting a face effect in response to an effect selection command; the face tracking type selection module 22 is used for selecting a face tracking type of the face effect in response to a face tracking type selection command; the face tracking sequence generation module 23 is used for generating a face tracking sequence based on the face tracking type; a face recognition module 24 is used for recognizing a face image captured by an image sensor; an effect superimposition module 25 is used for superimposing the face effect on at least one of the face images according to the face tracking sequence.

Further, the face tracking sequence generation module 23 is used for generating a face tracking sequence comprising all recognized faces based on the face tracking type being all faces.

Further, the effect superimposition module 25 is used for superimposing the face effect on all recognized face images according to the face tracking sequence.

Further, the face tracking sequence generation module 23 is used for: the face tracking type being a custom type, generating a face tracking sequence according to a custom tracking order based on the face tracking type being a custom type.

Further, the face tracking sequence generation module 23 further comprises a face number setting module 231, a first face identification setting module 232 and a face tracking sequence generation sub-module 233. Among which, the face number setting module 231 is used for setting the number of faces that need to be tracked; the first face identification setting module 232 is used for setting an identification of faces that need to be tracked; the face tracking sequence generation sub-module 233 is used for generating the face tracking sequence according to the number of face and the face identification, the face tracking sequence comprising face identifications of the number of faces.

Further, the face tracking sequence generation module 23 further comprises a tracking time setting module 234 for setting a start time and an end time of the tracking of the face according to the face identification, the face tracking sequence comprising the start time and the end time.

Further, the face recognition module 24 comprises a face recognition sub-module 241 for recognizing a face image captured by an image sensor by using face recognition algorithm, and a second face identification setting module 242 for setting a face identification for the face image according to the recognition order.

Further, the effect superimposition module 25 is used for reading the face identification from the face tracking sequence, superimposing the face effect on the face image corresponding to the face identification.

Further, the face effect comprises one or more of a two-dimensional sticker, a three-dimensional sticker, a beauty effect, and a deformation effect.

Further, the effect comprises more effects, and a face tracking sequence is generated for each effect.

The above apparatus for multi-face tracking with face effect is consistent with the method for multi-face tracking with face effect in the embodiment shown in FIG. 1. For details, refer to the foregoing description of the method for multi-face tracking with face effect, and details are not described herein again.

For details of the wording principle and the technical effects achieved of the embodiments for the method for multi-face tracking with face effect, please refer to the foregoing related description of the method for multi-face tracking with face effect, and details are not described herein again.

Figure 3:
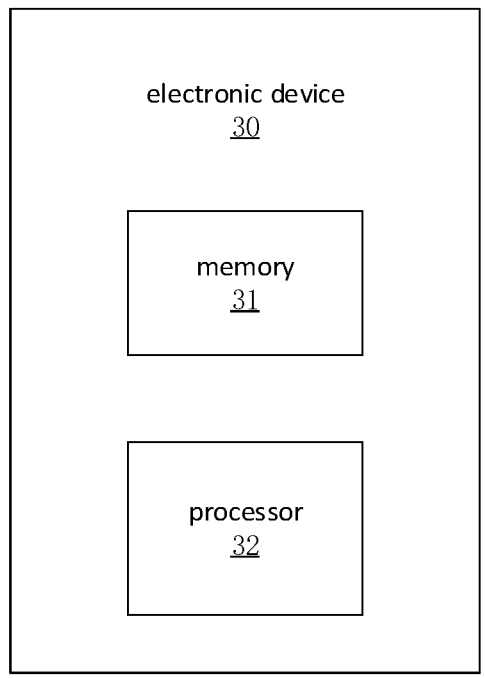
FIG. 3 is a structural diagram of an electronic device according to an embodiment of the disclosure.

FIG. 3 is a block view of an electronic device according to an embodiment of the disclosure. As shown in FIG. 3, the electronic device 30 according to an embodiment of the disclosure comprises a memory 31 and a processor 32.

The memory 31 is used for storing a non-transitory computer readable instruction. Specifically, the memory 31 may comprises one or more computer program products, which may comprise various forms of computer readable storage mediums, such as a volatile memory and/or a non-volatile memory. The volatile memory may comprise, for example, a random access memory (RAM) and/or a cache or the like. The nonvolatile memory may comprise, for example, a read only memory (ROM), a hard disk, a flash memory, or the like.

The processor 32 may be a CPU or other forms of processing units with data processing capabilities and/or instruction execution capabilities, and may control other components in the electronic device 30 to execute desired functions. In an embodiment of the disclosure, the processor 32 is used to execute the computer readable instruction stored in the memory 31 such that the electronic device 30 performs all or part of the steps of the method for multi-face tracking with face effect of the aforementioned embodiments of the disclosure.

Those skilled in the art may understand that in order to solve the technical problem of how to obtain a good user experience effect, a well-known structure such as a communication bus, an interface, or the like may also be included in the embodiment, and these well-known structures are also intended to be included within the scope of the disclosure.

For a detailed description of the present embodiment, reference may be made to the corresponding description in the foregoing embodiments, and details are not described herein again.

Figure 4:
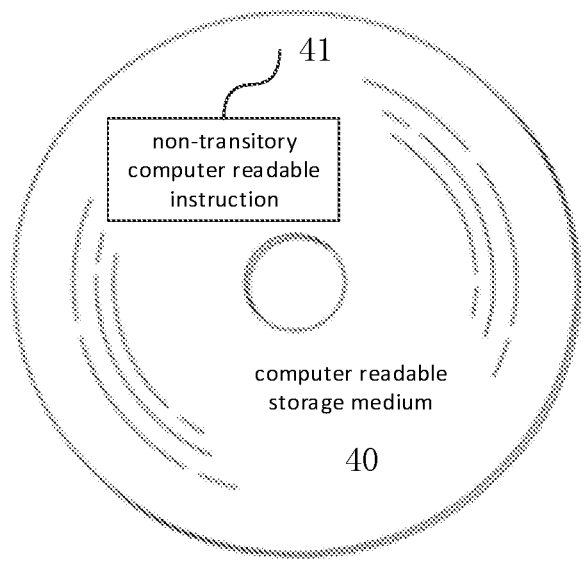
FIG. 4 is a structural diagram of a computer readable storage medium according to an embodiment of the disclosure.

FIG. 4 is a view of a computer readable storage medium according to an embodiment of the disclosure. As shown in FIG. 4, the computer readable storage medium 40 according to an embodiment of the disclosure stores a non-transitory computer readable instruction 41 thereon. When the non-transitory computer readable instruction 41 is run by the processor, all or part of the steps of the method for multi-face tracking with face effect of the aforementioned embodiments of the disclosure are performed.

The above computer readable storage medium 40 comprises, but is not limited to an optical storage media (e.g., CD-ROM and DVD), a magneto-optical storage media (e.g., MO), a magnetic storage medium (e.g., a magnetic tape or a removable hard disk), a medium having a built-in rewritable nonvolatile memory (e.g., a memory card), and a medium having a built-in ROM (e.g., a ROM cartridge).

For a detailed description of the present embodiment, reference may be made to the corresponding description in the foregoing embodiments, and details are not described herein again.

Figure 5:
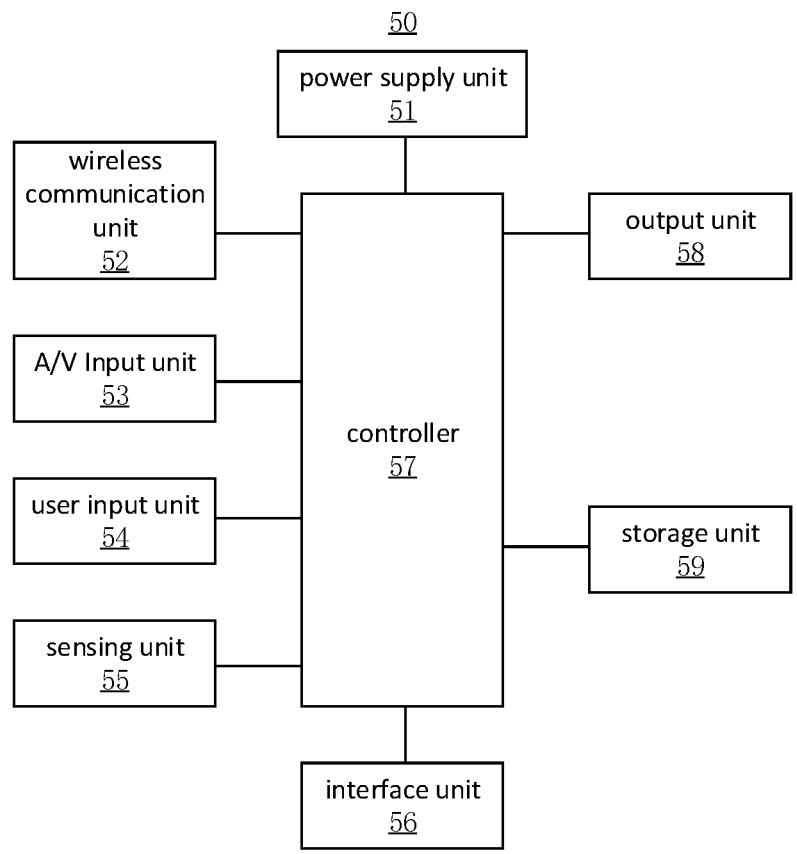
FIG. 5 is a structural diagram of a terminal for multi-face tracking of a face effect according to an embodiment of the disclosure.

FIG. 5 is a structural view of hardware of a terminal device according to an embodiment of the disclosure. As shown in FIG. 5, the terminal 50 for multi-face tracking with face effect comprises the embodiments of the apparatus for multi-face tracking with face effect.

The terminal device may be implemented in various forms, and the terminal device in the disclosure may comprise but is not limited to the mobile terminal device such as a mobile phones, a smart phone, a laptop, a digital broadcast receivers, PDA (personal digital assistants), a PAD (tablet), a PMP (portable multimedia player), a navigation device, a vehicle terminal device, vehicle display terminal, and onboard electronic rearview mirror, etc., and the fixed terminal device such as a digital TV, a desktop computer, or the like.

As an implementation for equivalent substitution, the terminal may further comprise other components. As shown in FIG. 5, the image effect processing terminal 50 may comprise a power supply unit 51, wireless communication unit 52, an A/V (audio/video) input unit 53, a user input unit 54, a sensing unit 55, an interface unit 56, a controller 57, an output unit 58, a storage unit 59, and the like. FIG. 5 illustrates a terminal having various components, but it should be understood that not all illustrated components may be implemented, and more or fewer components may be implemented instead.

Among which, the wireless communication unit 52 allows for radio communication between terminal 50 and a wireless communication system or network. The A/V input unit 53 is used for receiving an audio or video signal. The user input unit 54 may generate key input data in accordance with a command input by the user to control various operations of the terminal device. The sensing unit 55 detects a current state of the terminal 50, a position of the terminal 50, the presence or absence of a user's touch input to the terminal 50, an orientation of the terminal 50, and an acceleration or a deceleration movement and directions of terminal 50, etc., and generate a command or a signal for controlling the operation of the terminal 50. The interface unit 56 serves as an interface through which at least one external device may be connected to the terminal 50. The output unit 58 is configured to provide an output signal in a visual, audio, and/or tactile manner. The storage unit 59 may store a software program or the like that performs processing and control operations performed by the controller 57, or may temporarily store data that has been output or is to be output. The storage unit 59 may comprise at least one type of storage medium. Moreover, the terminal 50 may cooperate with a network storage device that performs a storage function of the storage unit 59 through a network connection. The controller 57 typically controls the overall operation of the terminal device. Additionally, the controller 57 may comprise a multimedia module for reproducing or playing back multimedia data. The controller 57 may perform a recognition processing in a manner of execution mode to recognize the handwriting input or the picture drawing input performed on the touch screen as a character or an image. The power supply unit 51 receives external power or internal power under the control of the controller 57 and provides appropriate power required to operate the various members and components.

Various implementations for the method for multi-face tracking with face effect provided by the disclosure may be implemented in a computer readable medium using, for example, computer software, hardware, or any combination thereof. For implementation by hardware, various implementations for the method for processing image effect provided by the disclosure may be implemented by using at least one of an application specific integrated circuit (ASIC), a digital signal processor (DSP), a digital signal processing device (DSPD), programmable logic device (PLD), field programmable gate array (FPGA), a processor, a controller, a microcontroller, a microprocessor, and an electronic unit designed to perform the functions described herein. In some cases, various implementations for the method for multi-face tracking with face effect provided by the disclosure may be implemented in the controller 57. For implementation by software, various implementations for the method for multi-face tracking with face effect provided by the disclosure may be implemented with separate software modules that allow execution of at least one function or operation. The software code may be implemented by a software application (or program) written in any suitable programming language, which may be stored in storage unit 59 and executed by controller 57.

For a detailed description of the present embodiment, reference may be made to the corresponding description in the foregoing embodiments, and details are not described herein again.

The basic principles of the disclosure have been described above in connection with specific embodiments. However, it should be noted that the advantages, advantages, effects, and the like mentioned in the present disclosure are merely examples and are not to be construed as limiting the benefits, advantages, effects, and the like, which are necessary for the various embodiments of the disclosure. In addition, the specific details of the above disclosure are only for the purpose of illustration and ease of understanding, and the above details are not intended to limit the invention to the specific details described above.

The block views of the devices, apparatuses, equipment, systems of the disclosure are merely illustrative and are not intended to be required or implied, and it is not intended or required to be connected, arranged, or configured in the manner shown in the block views. As will be appreciated by those skilled in the art, these devices, apparatuses, equipment, systems may be connected, arranged, and configured in any manner. Words such as "including", "comprising", "having", and the like, are meant to mean "including but not limited to" and may be used interchangeably. The terms "or" and "and" are used herein to mean the word "and/or" and are used interchangeably unless the context clearly indicates otherwise. The term "such as" as used herein refers to a phrase "such as but not limited to" and is used interchangeably.

In addition, as used herein, an "or" used in the enumeration of items beginning with "at least one" indicates a separate list, so that, for example, the listing of "at least one of A, B, or C" means A or B or C, or AB or AC or BC, or ABC (i.e., A and B and C). Moreover, the wording "exemplary" does not mean that the described examples are preferred or better than the other examples.

It should also be noted that in the systems and methods of the disclosure, various components or steps may be decomposed and/or recombined. These decompositions and/or recombination should be considered as equivalents to the disclosure.

Various changes, substitutions and alterations of the techniques described herein may be made without departing from the teachings of the invention as defined in the appended claims. Further, the scope of the claims of the disclosure is not limited to the specific aspects of the processing, machine, manufacturing, event composition, means, method or action described above. The processing, machine, manufacturing, event composition, means, method or action that currently exists or is to be developed later performing substantially the same function or achieves substantially the same results as the corresponding aspects described herein may be used. Accordingly, the appended claims comprise such processing, machine, manufacturing, event composition, means, method or action within its scope.

The above description of the disclosed aspects is provided to enable those skilled in the art to make or use the disclosure. Various modifications to these aspects are obvious to those skilled in the art, and the general principles defined herein may be applied to other aspects without departing from the scope of the disclosure. Therefore, the disclosure is not intended to be limited to the aspects shown herein, but in the broadest scope of the principles and novel features disclosed herein.

The foregoing description has been presented for purposes of illustration and description. Further, the description is not intended to limit the embodiments of the disclosure to the forms disclosed herein. Although a number of example aspects and embodiments have been discussed above, those skilled in the art will recognize certain variations, modifications, changes, additions and sub-combinations thereof.

The invention claimed is:

1. A method for multi-face tracking of a face effect, comprising:
    selecting a face effect in response to an effect selection command;
    selecting a face tracking type of the face effect in response to a face tracking type selection command;
    generating a face tracking sequence based on the face tracking type, wherein the generating a face tracking sequence further comprises:
        determining a number of faces to be tracked based on user input,
        generating identifications information corresponding to a plurality of faces to be tracked,
        generating the face tracking sequence based on the number of faces to be tracked and the identification information corresponding to the plurality of faces to be tracked, wherein the face tracking sequence is a sequence of the plurality of faces to be tracked, and wherein the face tracking sequence comprises the identification information corresponding to the plurality of faces to be tracked;
    in response to recognizing a first face in a face image captured by an image sensor, searching the face tracking sequence to determine whether identification information corresponding to the first face exists in the face tracking sequence; and
    in response to determining that identification information corresponding to the first face exists in the face tracking sequence, automatically superimposing the face effect on the first face.

2. The method for multi-face tracking of a face effect of claim 1, wherein the face tracking type is all faces, and the generating a face tracking sequence based on the face tracking type comprises:
    generating a face tracking sequence comprising all faces to be recognized.

3. The method for multi-face tracking of a face effect of claim 2, wherein the superimposing the face effect on the plurality of faces based on the face tracking sequence comprises:
    superimposing the face effect on all faces recognized in the face images based on the face tracking sequence.

4. The method for multi-face tracking of a face effect of claim 1, wherein the generating a face tracking sequence based on the face tracking type comprises:
    generating the face tracking sequence according to a custom tracking order based on the face tracking type being a custom type.

5. The method for multi-face tracking of a face effect of claim 1, wherein the face tracking sequence comprises information indicative of a start time and an end time of superimposing the face effect on each of the plurality of faces.

6. The method for multi-face tracking of a face effect of claim 1, further comprising:
    recognizing the plurality of faces in the face images captured by the image sensor using a face recognition algorithm.

7. The method for multi-face tracking of a face effect of claim 1, wherein
    the face effect comprises one or more of a two-dimensional sticker, a three-dimensional sticker, a beauty effect, and a deformation effect.

8. The method for multi-face tracking of a face effect of claim 1,
    wherein the selecting a face effect in response to an effect selection command comprises selecting a plurality of face effects in response to the effect selection command;
    wherein the selecting a face tracking type of the face effect in response to a face tracking type selection command comprises selecting a face tracking type for each of the plurality of face effects; and
    wherein the generating a face tracking sequence based on the face tracking type comprises generating a plurality of face tracking sequences corresponding to the plurality of face effects.

9. An electronic device, comprising:
    at least one processor; and
    a memory communicatively connected to the at least one processor; wherein the memory stores instructions executable by the at least one processor, and the instructions are executed by the at least one processor to cause the at least one processor to perform operations comprising:
    selecting a face effect in response to an effect selection command:
    selecting a face tracking type of the face effect in response to a face tracking type selection command:
    generating a face tracking sequence based on the face tracking type, wherein the generating a face tracking sequence further comprises:
        determining a number of faces to be tracked based on user input,
        generating identification information corresponding to a plurality of faces to be tracked, generating the face tracking sequence based on the number of faces to be tracked and the identification information corresponding to the plurality of faces to be tracked, wherein the face tracking sequence is a sequence of the plurality of faces to be tracked, and wherein the face tracking sequence comprises the identification information corresponding to the plurality of faces to be tracked;

in response to recognizing a first face in a face image captured by an image sensor, searching the face tracking sequence to determine whether identification information corresponding to the first face exists in the face tracking sequence; and in response to determining that identification information corresponding to the first face exists in the face tracking sequence, automatically superimposing the face effect on the first face.

10. A non-transitory computer readable storage medium, wherein the non-transitory computer readable storage medium stores computer instructions for causing a computer to perform operations comprising:

determining a face effect in response to an effect selection command;

determining a face tracking type of the face effect in response to a face tracking type selection command;

generating a face tracking sequence based on the face tracking type, wherein the generating a face tracking sequence further comprises:

determining a number of faces to be tracked based on user input, generating identification information corresponding to a plurality of faces to be tracked, generating the face tracking sequence based on the number of faces to be tracked and the identification information corresponding to the plurality of faces to be tracked, wherein the face tracking sequence is a sequence of the plurality of faces to be tracked, and wherein the face tracking sequence comprises the identification information corresponding to the plurality of faces to be tracked;

in response to recognizing a first face in a face image captured by an image sensor, searching the face tracking sequence to determine whether identification information corresponding to the first face exists in the face tracking sequence; and in response to determining that identification information corresponding to the first face exists in the face tracking sequence, automatically superimposing the face effect on the first face.

11. The electronic device of claim 9, wherein the face tracking sequence comprises information indicative of comprising a start time and an end time of superimposing the face effect on each of the plurality of faces.

12. The electronic device of claim 9, the operations further comprising:

determining a plurality of face effects in response to the effect selection command;

determining a face tracking type for each of the plurality of face effects; and generating a plurality of face tracking sequences corresponding to the plurality of face effects.

13. The non-transitory computer readable storage medium of claim 10, wherein the face tracking sequence comprises information indicative of comprising a start time and an end time of superimposing the face effect on each of the plurality of faces.

14. The non-transitory computer readable storage medium of claim 10, the operations further comprising:

determining a plurality of face effects in response to the effect selection command;

determining a face tracking type for each of the plurality of face effects; and generating a plurality of face tracking sequences corresponding to the plurality of face effects.

15. The method for multi-face tracking of a face effect of claim 1, further comprising:

setting a display duration of the face effect associated with identification information corresponding to one of the plurality of faces in the face tracking sequence;

displaying the face effect on the one of the plurality of faces in response to recognizing the one of the plurality of faces in face images; and causing the face effect to disappear from one of the plurality of faces based on the display duration.

16. The electronic device of claim 9, the operations further comprising:

setting a display duration of the face effect associated with identification information corresponding to one of the plurality of faces in the face tracking sequence;

displaying the face effect on the one of the plurality of faces in response to recognizing the one of the plurality of faces in face images; and causing the face effect to disappear from one of the plurality of faces based on the display duration.

17. The non-transitory computer readable storage medium of claim 10, the operations further comprising:

setting a display duration of the face effect associated with identification information corresponding to one of the plurality of faces in the face tracking sequence;

displaying the face effect on the one of the plurality of faces in response to recognizing the one of the plurality of faces in face images; and causing the face effect to disappear from one of the plurality of faces based on the display duration.

* * * * *